United States Patent [19]

Guha

[11] 4,004,816
[45] Jan. 25, 1977

[54] PROGRAMMER FOR RECORD PLAYER

[75] Inventor: Dwipendra Nath Guha, Huntington, N.Y.

[73] Assignee: Avnet, Inc., New York, N.Y.

[22] Filed: June 6, 1974

[21] Appl. No.: 477,171

[52] U.S. Cl. ............................................ 274/10 R
[51] Int. Cl.² ....................................... G11B 17/16
[58] Field of Search ......................... 274/10 R, 1 R

[56] References Cited

UNITED STATES PATENTS

| | | | |
|---|---|---|---|
| 1,700,969 | 2/1929 | Bauer et al. | 274/10 R |
| 2,092,169 | 9/1937 | Kohn | 274/10 R |
| 2,270,415 | 1/1942 | Catucci | 274/10 R |
| 2,348,924 | 5/1944 | Roe | 274/10 R |
| 2,685,447 | 8/1954 | Ristau et al. | 274/10 R |
| 3,460,840 | 8/1969 | Koepke | 274/10 R |
| 3,827,697 | 8/1974 | Miyoshi | 274/10 R |

Primary Examiner—Harry N. Haroian
Assistant Examiner—John W. Shepperd
Attorney, Agent, or Firm—Richard P. Crowley

[57] ABSTRACT

A record player is organized to play in succession a series of records to provide a programmer simulating an operatic performance, or playing of music of a selected mood extending over a period of time. The player also permits of automatic multiple playings of a single record. Simplified indicating and control means makes the programmer easily understood and easily operated. The player provides the aforesaid performance with either the standard 7 inch 45 RPM records or the standard 12 inch 33 RPM records. The mechanism employed is especially constructed to avoid disturbing mechanical noises.

9 Claims, 13 Drawing Figures

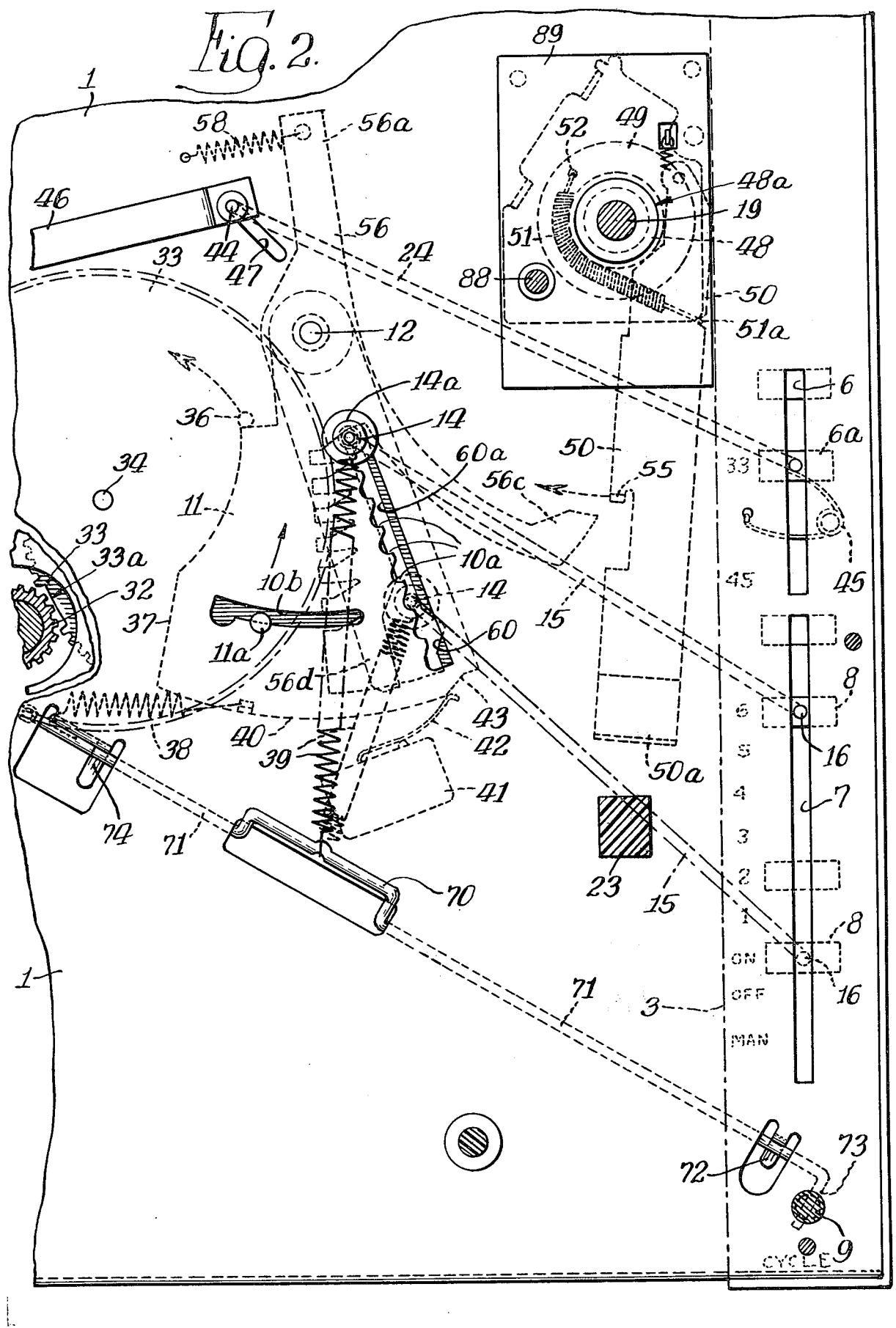

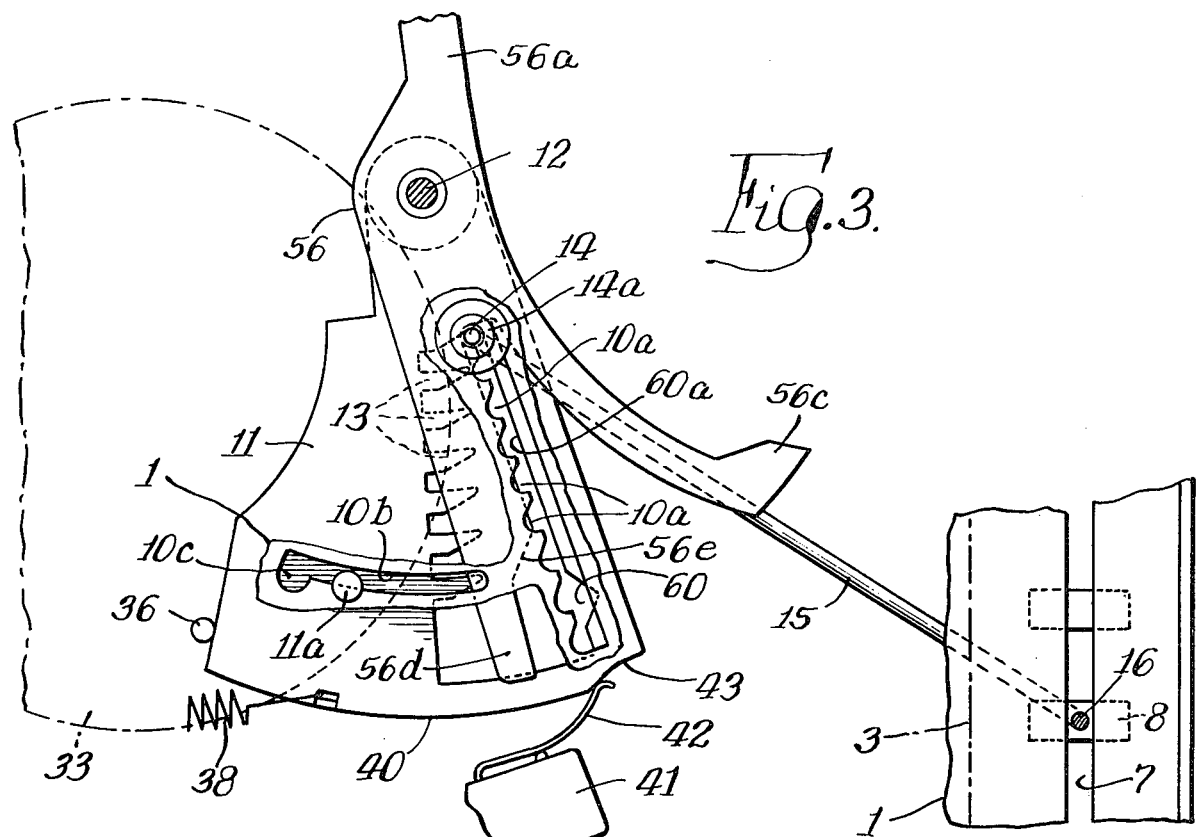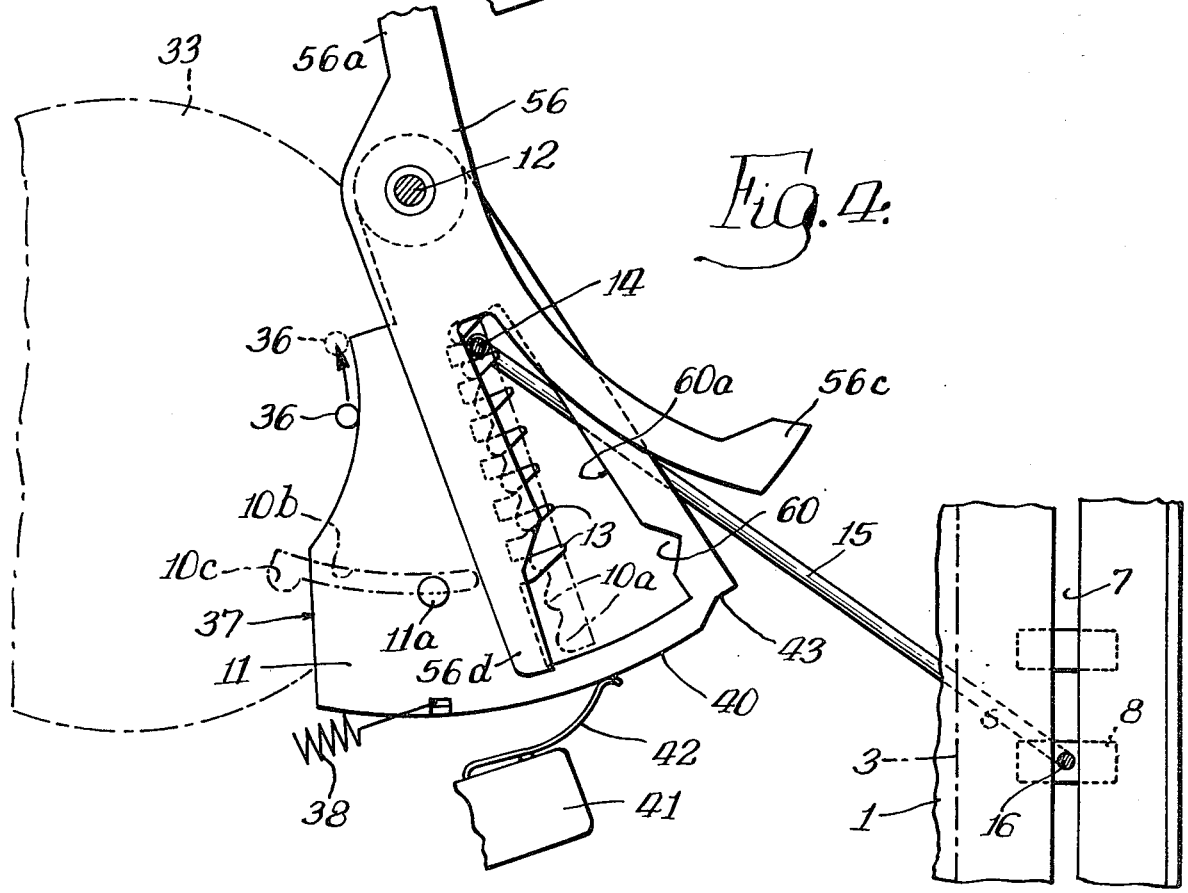

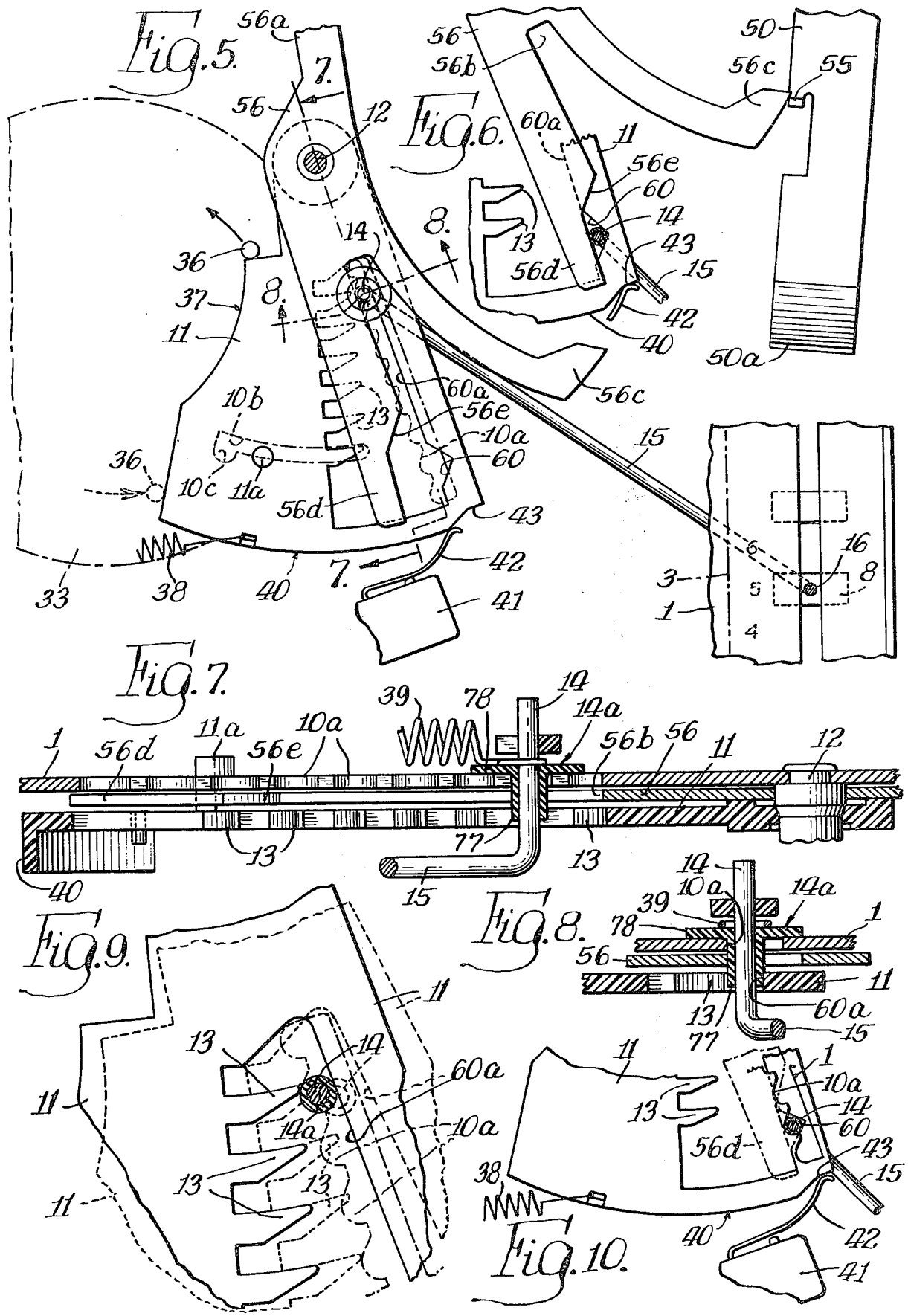

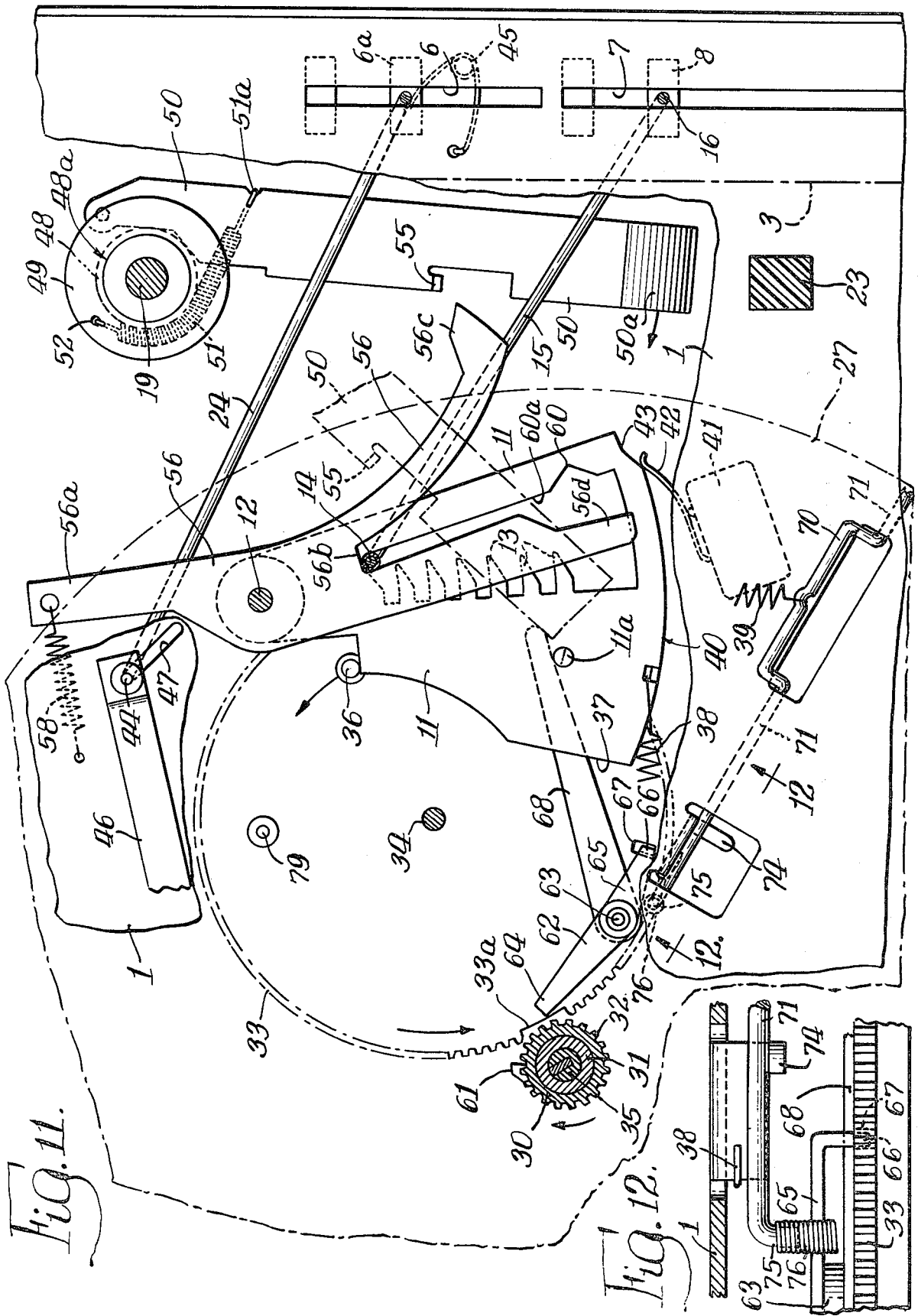

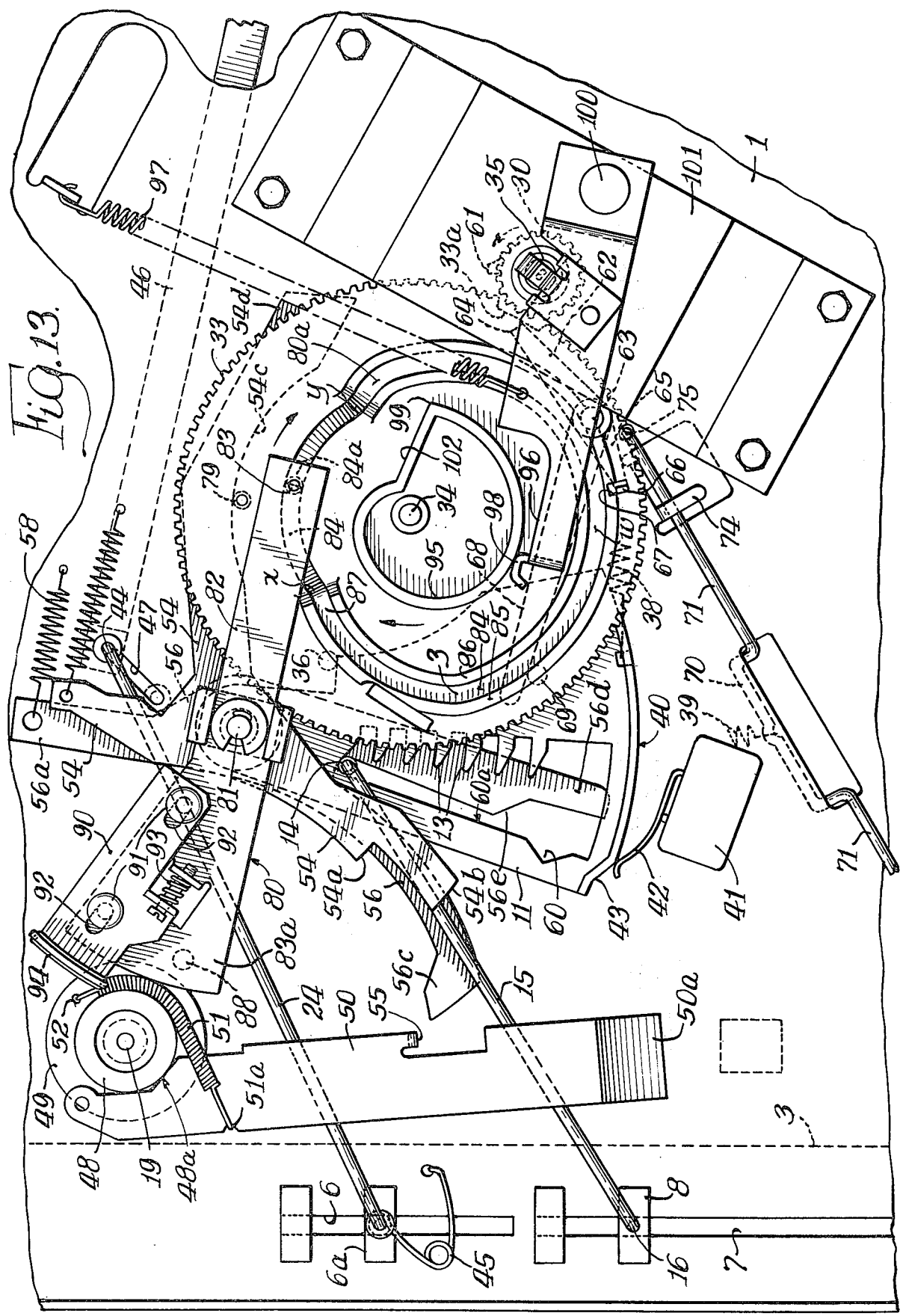

PROGRAMMER FOR RECORD PLAYER

BACKGROUND OF THE INVENTION

It is known to set up a stack of records on the central record supporting and dispensing spindle and to feed these records automatically onto the turntable and to play them in sequence until the stack is exhausted whereupon the player is automatically stopped. Automatic counting down records as played in sequence is known.

It is a desirable convenience to the operator, provided by the present invention, to have an initial indication of the number of records in the stack initially, and the number of records remaining in the stack at any subsequent time prior to shutdown. Also, it is desirable to be able to set the player control to repeat a specific single record a predetermined number of times and then to shut itself off.

BRIEF SUMMARY OF THE INVENTION

Herein a record player provides automatic playing in sequence of records in a stack in the order in which they are stacked. A counting mechanism counts the number of successive playing operations performed and shuts off the player when the predetermined number of playing operations has been accomplished. The machine may be loaded with records to its predetermined capacity—for example, six playings—or to any lesser number, and the programmer indicator set to the corresponding index number, and the machine then plays records to the number for which the indicator is set and then shuts off. Since the machine counts the successive playings—not the records—a setting of the programmer index for six records and supplying only one record in the stack and setting the machine into operation results in six playings of the single record before shutdown.

The machine is provided with a selector button and automatic adjustments adapting it to the feeding and playing of 33 RPM records, or 45 RPM records, without intefering with the programmer function.

The mechanism in which the preferred form of the invention is embodiment comprises a mechanical escapement and a connected linear indicator mechanism of simplicity, reliability and compactness and with a minimum of mechanical noises.

Upon completion of playing of each record from the stack, an escapement mechanism is stepped forward toward a final OFF position, arrival at which stops the motor when the last record has been played.

The invention provides for termination of the program at the end of playing of each record of the stack and shutting off the player by the simple operation of moving the indicator knob to OFF position thereby eliminating the remainder of the program.

THE PRIOR ART

The requirement for the record player to count the number of playings effected and then shut down the designated number of record playing has been accomplished—with option to interrupt and reconstitute the programmer voluntarily at any stage—is not developed in the prior art beyond what is shown in such structures as U.S. Pat. Nos. 2,092,169 and 3,438,636.

OBJECTS OF THE INVENTION

The chief object of the invention is to provide a programming mechanism in a record player, in a simple compact embodiment, with minimum space requirements and without interfering with other necessary or desired functions of the record player.

A further object is to provide a simple, easily understood and easily operated programming equipment for an automatic record player.

A further object of the invention is to give the operator the option of setting the player for automatically playing a stack of records in succession and then manually shutting off the machine prior to finishing playing of the complete program. Alternatively, any number of records within the predetermined capacity of the machine may be played from the stack successively under manual control.

It is a further object of the invention to provide for repeated playings of one record any number of times automatically within the capacity of the machine which, as herein illustrated, is six records.

It is a further object of the invention to provide for the programming and playing of stacks wherein each stack is composed of records of the same size, but the stacks are of different diameters with corresponding speeds. This is accomplished by appropriate setting of a single control member.

It is a further object of the invention to provide means for automatic shutting down of the player when the predetermined numnber of playings on the program has been completed, or for manually stopping the programmer at the completion of any remaining record of the program.

A still further object of the invention is to provide a programmer mechanism which comprises operating parts designed and constructed and related to avoid sharp clicking metallic noises. This is accomplished through the application of two central concepts. First by providing, where possible, escapement members involving a gradual shifting of the members of an escapement or force transmitting mechanism to transfer a member which is required to be moved from one position to another to effect its function, by a transfer wherein the member to be transferred, although it is moved by a spring, never leaves the connection with the transferor means until after the transferee means has started to take the load thereby avoiding the sharp mechanical clicks which disturb a program of reproduced music as now practiced. Second, according to this invention said transfer is performed by utilizing as the transferee of such transferring couple a synthetic organic plastic such as "Delrin" for receiving the impact, i.e., the force receiving member, which member in general is the chief sound emitting member.

DESCRIPTION OF THE DRAWINGS

FIG. 2 is a horizontal section taken immediately below the turntable illustrating the programmer play indicator and escapement therefor and the speed and size control for adjustment to different size and speed records;

FIG. 3 is a plan view of the programmer escapement mechanism at the beginning of a program playing operation;

FIG. 4 is a similar view of the same parts shown in FIG. 3 after taking the first step in release of number six record which is at the bottom of the stack;

FIG. 5 is a view similar to FIG. 4 showing the position of the same parts after completion of the first step of the programmer after playing the sixth record of the stack and advancing to the second record to be played, which is number five in the stack;

FIG. 6 illustrates the blocking of the tone arm trip lever by the rest lever after completion of playing of the last record, which is at the top of the stack, and opening of the motor switch;

FIG. 7 is a longitudinal section taken on the line 7—7 of FIG. 5 looking in the direction of the arrows showing the position of the escapement pin of the programmer rod between the stationary notched slot and the movable programmer plate;

FIG. 8 is a section taken on the line 8—8 of FIG. 5 through the programmer rod 10 and the parts containing the movable and stationary notched slots;

FIG. 9 is a fragmentary detailed sectional view on an enlarged scale showing how the teeth of the cam plate dislodge the programmer rod pin in moving the pin from one notch in the base plate slot to the next adjacent notch;

FIG. 10 is a detailed illustration similar to FIG. 6 of the escape of the program rod pin into the larger V-notch of the swinging cam plate with consequent actuation of the switch to open the motor circuit and holding of said pin by the programmer plate with the motor switch in open position and the tone arm trip lever held by the rest lever;

FIG. 11 is a horizontal section taken on a plane immediately below the base plate showing the layout assembly of operating parts of the programmer for explaining the initiation of the operation of the player programmer;

FIG. 12 is a fragmentary view of the end of the cycling trip rod showing the flexible tip thereof; and FIG. 13 is a bottom plan view of the record player showing the controlling cam and cam followers and parts immediately associated with it.

DESCRIPTION OF THE MECHANISM SHOWN IN THE DRAWINGS

Figure 1:
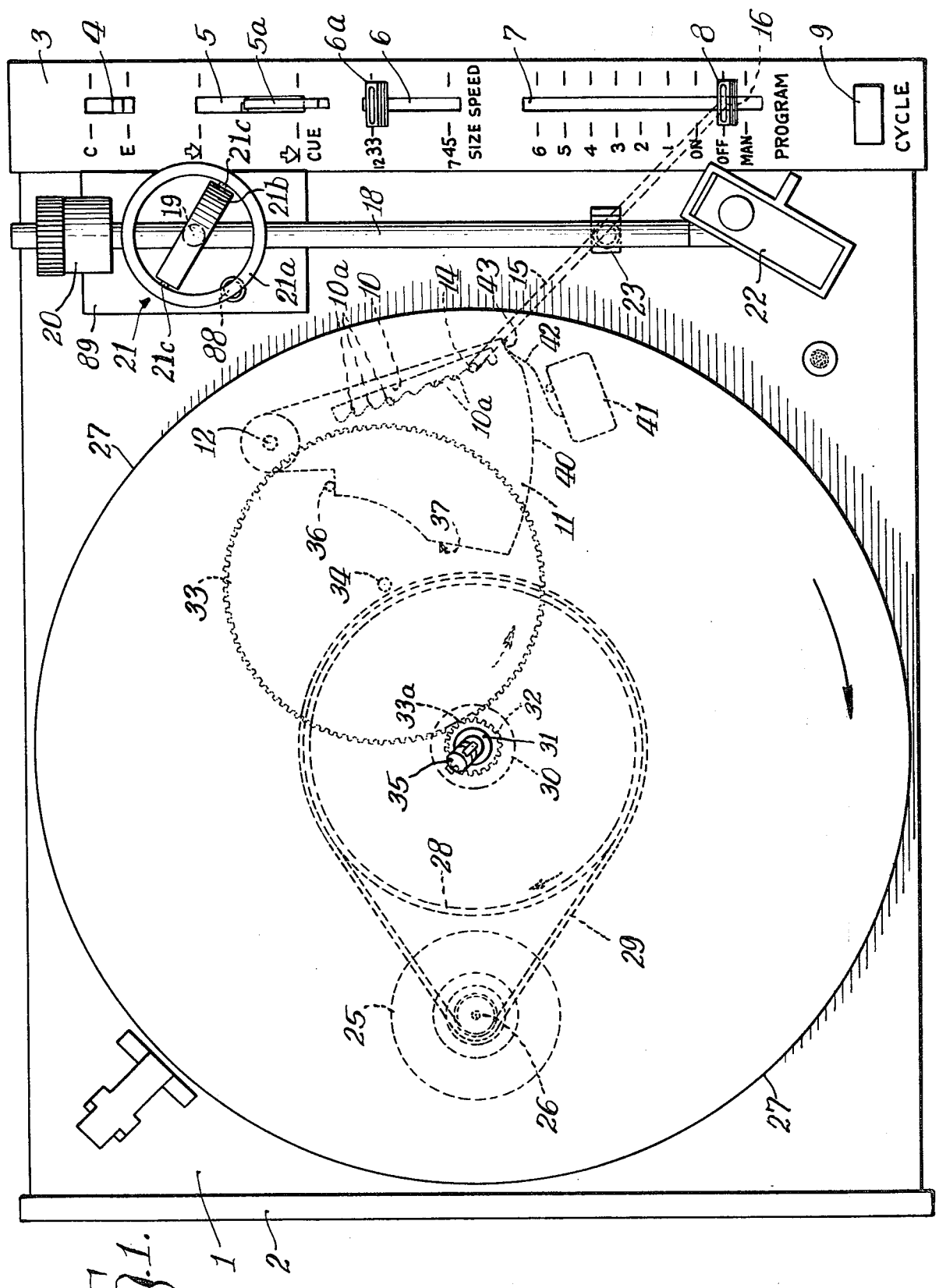
FIG. 1 is a top plan view of the programmer record player of my invention with certain major parts located below the base plate shown in dotted lines, viewed as a horizontal section taken immediately below the frame plate.

Referring to FIG. 1, a stiff rectangular stamped metal base plate 1 is flanged downwardly on all four sides as viewed in FIG. 1. An ornamental stiffening bar 2 is attached at the left-hand flange as shown in FIG. 1, and an indicator plate 3 is attached to and overlies the righthand end of the plate as viewed in FIG. 1. This indicating plate 3 has slots at 4 and 5 for pickup needle control and indicating purposes. A slot 6 is provided with a guided knob 6a for shifting the controls for playing speed and diameter of records of two different sizes of records and of correspondingly different speeds. The lower part of the indicator plate 3 has a slot 7 containing a slidable indicator knob 8 mounted on the transverse end of the programmer rod 15 and has along the side of the same certain indications for numbers of records including the numbers 1 to 6 which correspond to the number of records which remain to be played when the button or knob 8 is in register with the corresponding numeral, as will be explained later. The plate 3 further carries indications ON, OFF and MAN. The latter indicates manual control when the knob 8 is in register with that indication. Also, the indicator plate 3 includes depressable button 9 which is labeled CYCLE, this button 9 being depressed to initiate the operation of the player-programmer after loading and after adjustment for record size have been made.

The base plate 1 has a slot 10 extending therethrough and it mounts on its underside a programmer plate 11 (shown in detail in FIG. 11) pivoted at 12 on the bottom side of the base plate (see FIG. 1). The slot 10 has a series of rounded scallops or notches 10a along one edge (FIGS. 5–9) remote from the index plate 3 for cooperation with the programmer pin 14 formed on the end of the programmer rod 15. The programmer rod 15 has its lower end 16 (FIGS. 3 and 4) bent at right angles to its length and extended into and being angularly movable in the slidable programmer knob 8 being hinged therein at 16 on a vertical axis, as viewed in FIG. 1. The control knob 8 has three unnumbered but labeled control positions, the central position being marked OFF, the position immediately above the OFF position is marked ON, and the position below the OFF position is marked MAN, indicating manual control.

Tone arm 18 is pivoted on a vertical axis on the shaft 19 which is illustrated in FIGS. 2 and 11. The tone arm is mounted for vertical play on a horizontal axis with a suitable adjustable counter-balance 20 and gimbals 21 and 21b providing angular adjustments on two intersecting axes, copending application Ser. No. 516,798, filed Oct. 21, 1974 now U.S. Pat. No. 3,949,995.

The record size and speed selector button 6a which is slidably guided in the slot 6 adjusts the playing mechanism for either of two sizes of records—namely, 33 RPM of 12 inches diameter or 45 RPM of 7 inches diameter. Controls which adjust the mechanism for appropirate speed of the turntable, and traverse of the tone arm, and effected by appropriate positioning of the slider or button 6a, as hereinafter described.

A synchronous electric motor 25 is mounted on the lower side of the base plate with its shaft 26 extending through and above the base plate. The motor shaft mounts an elastic two-diameter flat belt pulley 26 above the base plate. The outline of the turntable 27 is shown in full lines on FIG. 1. The turntable 27 has on its lower side, below the base plate 1, a cylindrical drum 28 shown in dotted lines in FIG. 1. An elastic belt 29 is trained over the drum 28 and over the selected track of the pulley 26. The pulley has two tracks of different diameters to correspond to the required playing speeds of the 45 RPM records and of the 33 RPM records, respectively. Suitable belt shifting means connected to shifter bar 46 (FIG. 2) is controlled by the slider button 6a. The turntable 27 has a hollow depending central hub 30 shown in dotted lines in FIG. 1, the said turntable hub having a bore fitting over the fixedly mounted sleeve 31 supported on a bracket (not shown) mounted on the bottom of the base plate 1. The sleeve 31 supports the record supporting spindle 35 which is provided with a push off lever of well known construction.

The pinion 32 and the hub 30 of the turntable 27 are shown in full lines in FIG. 11, and the hub shown in dotted lines at 30 in FIG. 1. The hub 30 carries the pinion at its lower end. This pinion 32 is in constant rotation with the turntable 27 while the player is in operation.

The combination lug 61 and gear 32 (FIGS. 1 and 11) is mounted on a sleeve 31 fixed in a bracket mounted on the bottom of the base plate. The gear 33 and cam lug 61 combination controls and effects the operations of various functional parts of the present player-changer ancillary of the present invention.

The pinion 32 which is formed on the hub of the turntable 27 and is journaled on the sleeve 31 FIG. 1) is adapted to mesh intermittently with the teeth of the cam gear 33 which carries the control cams for performing the chief functions of the player. The cam gear 33 has its gear teeth interrupted for a gap great enough to disengage the teeth of the gear 33 from the pinion 32 (FIGS. 1, 2, 11). The pinion teeth are continuous.

Reengagement of the teeth of the gear 33 and of the pinion 30 is provided for in known manner upon inward movement of the tone arm tracking in the "fast grooves" at the innermost part of the record just completed. The cam gear wheel 33 which carries the control cams for the programmer operates those cams through a complete cycle in a full rotation of the mutilated gear 33. Then it comes back to the position shown in FIG. 1 with the blank edge 33a opposite the teeth of the pinion 32 whereupon the parts exercising the control functions are quiescent during the playing operation of the pickup needle in the record groove of the record last dropped on the turntable.

The record holding and dispensing spindle 35 which may be of any known or preferred form is shown in FIGS. 1 and 11 as extending above the turntable 27 to support above the turntable, on a shoulder, the selected stack of records of the program to be performed. The control cam gear 33 carries a fixed pin 36 (FIG. 1) which cooperates with the edge 40 of the programmer plate 11 that is journaled on the pivot pin 12 carried on the base plate 1 (FIGS. 1 and 11). The cam gear 33, each time it is put into action, first rotates through a limited angle and then causes dropping of the next record of the program to be played. The record dropping control cam 95 (FIG. 13) operating through the lever 96 and spring 97 operates the pushoff lever of the record stack holding spindle 35 after withdrawal of the tone arm 18 from above the turntable 27 in order for the lever 96 to be actuated by spring 97 to drop the lowermost record from the stack and guide it onto the turntable in a manner well known in the art. Thereafter the blank space 33a in the teeth of the gear wheel 33 allows the control cam to remain stationary until after the playing of the thus dropped record has been completed. This occurs by virtue of the fact that the trip lever 50 has, at the end of playing the record uppermost on the turntable, swing into contact with the trip lever arm 68 of the trip lever 62 (FIG. 11, dotted lines) and caused connection of the cam gear 33 with continuously rotating pinion 30 thereby initiating playing of the next record in the program.

The programmer activating pin 36 carried by the controlling cam gear 33 moving counterclockwise (FIG. 11) cooperates with the programmer plate 11 to engage the edge 37 of the plate 11 and swing the plate 11 counterclockwise around its pivot pin 12 against the tension of spring 38 which tends to move the programmer plate 11 in a clockwise direction (FIGS. 2 and 11).

The pin 36 on the controlling cam and gear wheel 33 is timed to engage the programmer plate 11 at the edge 37 and cause the programmer plate 11 to swing on its pivot pin 12 in a counterclockwise direction in FIGS. 1, 2 and 11. This motion serves to push or cam the programming rod pin 14 from its position in a notch 10a along the edge of the slot 10 and to cause it to assume the next lower notch under the influence of the tension spring 39 shown in FIG. 2. This movement is completed and the next record dropped after the pin 36 has passed the upper edge of the programmer plate 11 as shown in FIG. 2.

THE COUNT DOWN MECHANISM

The indicator for the "count down" mechanism comprises the index plate 3 and the sliding knob 8 which is mounted on the transverse end 16 of the rod 15 which is guided in the slot 7 in the base plate 1. The rod 15 has a right angle transverse end portion 16 which extends through the slot 7 and into the sliding knob 8. The knob 8 is movable along the slot 7 and into any one of the three control positions indicated as ON, OFF and MAN (manual) or into any one of the numbered positions 1 to 6 to limit the number of playings to be performed before the recycling cam 33 is stopped with the motor still running and rotating the turntable and with the tone arm 18 is rest position as in FIGS. 1 and 2.

Also, after loading the spindle, the knob 8 may be moved into register with any of the numerals 1 to 6 inclusive, representing the number of playings of the records which are stacked on the spindle 35 for playing in a program. The counting mechanism counts the number of playings — not the number of records.

If a less number of records than six—for example, four—be stacked on the spindle and the player started playing by depression of the CYCLE button 9, the player will proceed to play the four records in succession and then proceed to play the last record two more times.

The programmer rod 15 which lies below the base plate 1 extends from the end 16 held in the button 8 along the under side of the base plate diagonally towards the programmer plate 11 which overlies the notched slot 10 in the base plate. The round notches 10a in the base plate are disposed in a diagonal line converging towards the lower end of the slot 7 in the indicator plate 3. The spring 39, shown in FIG. 2 in both its contracted (dotted line) and its longer expanded (full line) condition, has a force component tending to hold the pin 14 in the notches 13 of the programmer plate 11 but this does not prevent movement of the button 8 in the slot 7 to set the said button in register with any one of the number 1 to 6 for indicating the number of records to be played in the program.

In the operation of a player embodying the programmer of the present invention, the circuit of the electric motor is put under the control of the automatic switch 41 which has an acutator 42 which engages the lower edge 40 of the programmer plate 11, said actuator 42 (FIG. 5) being depressed to close the circuit by the extended lower edge 40 of the plate, which edge serves as a cam. A notch 43 (FIGS. 5 and 10) at the lower right hand corner of cam 11, as viewed in FIGS. 2, 5, 6 and 10, when it registers with the actuator 42 allows the actuator 42 of the switch to rise into the notch and open the circuit. In operation of the programmer the automatic operation of the switch 41 facilitates starting the operation of playing the program, and also stopping the machine when the program has been played. The playing of the selected program may be interrupted by moving the knob 8 to OFF position and may again be resumed by moving the knob 8 upwardly to the number of records still to be played. The exterior outline of the programmer plate 11 is indicated in FIG. 1 in dotted lines, and the full outline with the cam teeth is illustrated in FIGS. 3, 4 and 11.

Stepping Mechanism of the Programmer

An essential characteristic of the programmer is its ability to play automatically in succession a stack of records placed on the record holding spindle. That service requires the performance of the necessary steps of swing out of the tone arm, drop of the record, swing in the tone arm and lower the pickup, play the record, and repeat the same performance until the full stack has been played and thereupon to shut itself off. That procedure broadly is old. The successive steps of dropping a record and playing the same accompanied by a countdown are performed herein through the use of the programmer plate 11 in cooperation with the notches 10a in the slot 10 in the base plate and through the cooperation of the programmer rod 15. The essential functions of controlling the stepping or escapement mechanism employed to produce the repeated performance of dropping and playing of each record falls upon the rotary cam 33 which governs the dropping of the record, the playing of the same, and the stepping forward to the succeeding dropping and playing operations and then shutting down.

The machine of the present disclosure is organized to perform these operations selectively upon a stack of 12 inches 33 RPM records or, alternatively, on a stack of 7 inches 45 RPM records. The difference between the two operations involves not only difference in diameter of the record but difference in the rotative speed of the same. The rotative speed is controlled in the present instance by changing the driving ratio between the fixed speed motor and the turntable and the rotating control cam by shifting the belt on the two diameter motor pulley (not shown). The difference in diameters of the records requires different set down positions of the pickup and tone arm, but the general control functions of playing a stack of records automatically in sequence, or playing records, manually controlled, and automatic shutting off of the machine are not affected by the size or speed of the records to be played when the controls are set accordingly.

Assuming that the size and speed control button 6a is set in the position shown in FIGS. 1, 2 and 3, control is exercised by adjustment of the knob 6a connected to a rod 24 (FIG. 2) the end of which rod is bent at a right angle to form a wrist pin 44 riding in a slot 47 to operate the speed shift with the air of an overcenter snap spring 45. The actuation of the belt shifter mechanism by an endwise movement of the bar 46 effects shifting movement of the belt from one pulley to the other by a bell crank shifting member in accordance with the requirement for higher or lower speeds of the record to be played. The differences in set down location of the pickup are reflected in the stop shoulders 54a and 54b of the set down lever 54 shown in FIG. 13.

Since shifting operations from the larger 12 inch records to the smaller 7 inch records, the vice versa, involve not only difference in rotational speed but difference also in the radial dimension of the playing grooves, provision is made for set down of the pickup and its tone arm at the corresponding radius of each, and interconnected means for changing the turntable speed through the same control knob 6a.

Set Down Control

Provision is made in the track 84 on the control cam 33 for raising and swinging the vertical tone arm shaft 19 to the correct angular position for set down of the pickup of beginning the playing of a record and for raising and returning the tone arm toward its rest position immediately after playing of a record.

Referring to FIGS. 2, 11 and 13, the tone arm shaft 19 has a sleeve 48 with a cylindrical friction surface 48a and a flange 49. The shaft 19 upon which the collar 49 is mounted is itself mounted in a bearing above the base plate for rotational and axial confinement. The hub 48 is fastened on the tone arm shaft 19 and is yieldably connected to the inner end of trip lever 50. The inner end of the trip lever 50 (FIG. 2) is pin-hinged on the collar 49, which pin hinge is carried by the collar 49 of the hub 48. A tension spring 51 attached at 52 to the flange 49 extends partly around the hub 48 and is anchored under tension to the trip lever 50 at 51a. The lever 50 thus normally moves with the swing of the tone arm shaft 19 in a counterclockwise direction in FIG. 11 but yields its angular position under the tension of the spring 51 to avoid excessive strain upon the associated parts when the angular movement of the hub 48 is swung in the clockwise direction in dotted lines in FIG. 11. The arm 50 thus can yield with increased tension of the spring 51 in the movement of the tone arm toward the center of the turntable, but is moved positively in the opposite direction to advance to idle or rest position in FIGS. 2 and 11.

Control of Set Down Position

The control of the set down position of the tone arm and pickup in the outer groove of the selected size of record is exercised by the shoulders 54a and 54b of the set down lever 54 (FIG. 13) which is a three-armed lever with the arms bearing said shoulders 54a and 54b adapted to be brought selectively into the path of the lug 55 on the trip lever 50 for set down of the pickup at the corresponding radii for the respective diameters of the stack. This selection is necessary for the playing of a stack of records of 7 inch or 12 inch diameter.

The selection of 12 inch records operated at 33 RPM calls for presentation of shoulder 54b to the counterclockwise swing of the trip lever 50, as viewed in FIG. 13. That action is brought about by the adjustment effected by placing button 6a (FIG. 1) in the position shown in FIG. 1, i.e., corresponding to 12 inch records operable at 33 RPM. The consequence of this adjustment is that lever 54 will be swung (clockwise in FIG. 13) around the mounting pin 81 far enough that the arm 54 will be held for a moment at a fixed radius by the pin 79 on the cam gear 33 to keep the lever arm 54 out of register with the lug 55 of the trip lever 50 during the initial outward swinging movement of the trip lever 50 and the tone arm 18 to clear the record dropping operation.

When 33 RPM records are stacked for a program, the rod 24 will have its transverse end 44, which is guided in slot 47 in the base plate, disposed in the upper end of said slot 47 where it serves as a stop for the lever arm 54a for playing 33 RPM (12 inch) records.

For 45 RPM 7 inch records, the control knob 6a will be registered with the corresponding indication on the chart 3 (FIG. 1) at the lower end of the slot and the rod 24 will pull the wrist pin 44 at the upper end of the rod down the slot 47 to limit the set down lever 54 (FIG. 13) to stop position registering the end 54b with the lug 55 on trip lever 50 to bring the pickup needle upon set down into register with the outer groove of the 7 inch 45 RPM record on the turntable.

The shifting of the radius of set down of the tone arm needle relative to the turntable is accompanied by shifting of the change speed bar 46 which controls the shift of the elastic belt from one size motor pulley to the other size in each case. The belt embraces the drum 28 and it will adjust its position on the drum automatically.

Function of the Rest Lever

The rest lever (side control lever) 56 is a Y-shaped lever pivoted at its central point on pivot pin 81 (FIG. 13) which is a continuation of pin 12 holding the programmer plate 11. The upper arm 57 has a light coil spring 58 connected to a stationary anchor on the baseplate 1 tending to swing the lever 56 clockwise in FIG. 13. The limb of 56 terminates in a foot 56c adapted to be brought into the path of lug 55 on the trip lever 50 to block free swinging of the tone arm (FIG. 6) when all records have been played and the machine is not in use. This holds the tone arm in its outermost position. As may be seen in FIG. 13 the programmer rod 15 is set, with the pin 14 at the upper end of the cam teeth 13, in the same position as in FIG. 11 where it is viewed from above.

As shown in FIG. 11 the programmer pin 14 is disposed in the open triangular slot or window in the programmer plate 11, and the spring 58 draws the upper end 56a of the rest lever 56 counterclockwise about the pivot pin 12 and thereby tends to retain the said pin 14 between the limb 56d of the rest lever 56 and the straight edge 60a of the window in the programmer plate 11. Thereby the rest lever 56 is kept from swinging about its pivot pin 12 and throwing its foot 56c into the path of the lug 55 of the trip lever 50. That is not to be permitted until play of the last record of the program is completed, for the trip lever 50 must swing into the dotted line position and kick in the trip lever 68–62 to throw the teeth of pinion 32 and cam gear 33 into mesh.

The director for that stage is the position of the programmer rod 15 and its pin 14 and connected button 8.

As the stack is played the programmer pin 14 is stepped down the notches 10a in the edge of the base plate slot 10 by the spring 39 and reciprocation of the programmer plate 11 stepping the pin 14 downwardly (FIG. 11) between the edge 11a of the slot in the programmer plate 11 and limb 56d of the rest lever 56.

The progress of the programmer pin 14 can be most readily understood from FIGS. 2, 5–11. As the pin 14 descends the slot 10 in the base plate by successive hops from one scalloped or rounded notch 10a to the next, the pin 14 blocks movement of the rest lever 56 counterclockwise, as viewed in FIGS. 5, 6 and 11, until the pin 14 reaches the V-notch 60 in the programmer plate 11 (FIG. 6) whereupon the rest lever 56 swings the foot 56c into register with the lug 55 of trip lever 50 thereby holding the tone arm shaft 19 and preventing swinging movement of the tone arm out over the turntable. At the same time the permitted additional movement of the programmer plate 11 allows the motor switch to open the motor circuit (FIGS. 6 and 10) by dropping of the actuator 42 into notch 43.

The Control Cam and Gear 33

The control cam carried on cam gear 33 (FIG. 1) is intermittently operated by the meshing teeth on the pinion 30 and the cam gear 33. The pinion 30 is continuously driven so long as the switch 41 is closed. The cam gear 33 has a gap 33a on its periphery with no teeth, and unless the drive is carried across the gap 33a the cam gear will not move forward. This discontinuity of drive of the cam gear wheel 33 is bridged by the trip lever 62 on the cam gear wheel 33 engaging the moving lug 61 of the continuously driven pinion 30 carried on the hub of the turntable as described hereinafter.

The cam gear wheel 33 of polyethylene has cam surfaces engaging the cam follower 83 which provide for the swinging of the tone arm on the vertical shaft 19, lowering of the needle into the first groove, allowing the needle to track and play, raising the tone arm and needle when the fast grooves are encountered at the central part of the record, lifting the tone arm and returning it to its initial position outside the rim of the turntable.

Description of the Count Down Mechanism

The position control lever or rest lever 56 FIGS. 2, 11 & 13) is pivoted on the same pin 12, 81 as the programmer plate 11 and it is related to the programmer plate 11 and to the record size control rod 24 to cause the rest lever arem 56d to sweep the programmer pin 14 down along the inclined edge 56e of the lever 56 (FIG. 13) into the V-notch 60 of the programmer plate to cause opening of the switch, as illustrated in broken lines in FIG. 10, whereupon by action of the spring 38 (FIG. 10) the programmer plate 11 will move clockwise in FIG. 10 to allow the programmer plate to move far enough to bring the depression or notch 43 (FIG. 10) in to register with the switch actuator 42 and allow the motor switch 41 to open the circuit to the motor. The cam return spring 38 which is anchored to the base plate 1 through the spring hook 38 shown in FIG. 12 tends to swing the programmer plate 11 clockwise (see FIGS. 5–10). This motion is limited by the engagement of the straight edge 60a against the pin 14 which is thereby held in the notch 10a in the base plate until the registering tooth 13 pushes the pin 14 out of its then engaged notch and therby puts it one step nearer the deep notch 60 in the lower end of the edge 60a. The said edge 60a limits the extent of clockwise motion of the return of the programmer plate 11 to a position where the pin 14 of the programmer rod 15 keeps the programmer plate 11 from moving the notch 43 under the switch actuator 42 of motor switch 41.

Guide for the Programmer Plate

The programmer plate 11, pivoted at 12, is, for quiet operation as well as for long life with low noise and low friction purposes, made of a plastic "Delrin". It is pivoted on stud 12 which is attached to and extends downwardly from the bottom surface of the base plate 1. Since it is thin and relatively flexible and extends from its mounting hub on the pin 12, support normal to its plane of movement at a substantial radial distance from the pin 12 on which it is mounted is provided. This desired support is provided at a substantial radius from the pivot pin 12 by forming an arcuate slot 11a with an enlarged opening 11b in the base plate 1 to receive entry of the full cross section of the pin 11c, and forming on the lower side of the program plate 13 an integral pin 11c with a narrow transverse groove embracing the edge of the arcuate opening 11a in the base plate 1 concentric with the pivot pin 12 (FIG. 5. By this construction the thin plastic program plate gains lateral support at a constant radius from the hinge or pivot pin 12 about which the programmer plate is swung outwardly by the actuating pin 36 and inwardly by the tension spring 38. The support for the reciprocating plate 11 is substantially noiseless.

The Cam Gear 33

The operator has control of loading the spindle 35 with a permitted maximum number of records, all of the same size, for a program. Having set the "size" button 6a in the appropriate position corresponding to either the 33 or the 45 RPM records and having moved the slide 8 which indicates the number of playing operations to be performed, the operator can start the automatic playing operations by depressing CYCLE button 9 having previously shifted the button 8 from the OFF position shown in FIG. 1.

The movement of the knob 8 to the ON position against the tension of the programmer spring 38 (FIG. 2) moves the programmer pin 14 out of the V-notch 60 of the programmer plate 11. Preferably, the movement of the slide button 8 is performed after the desired complement of records to be played in the program have been threaded on the spindle. The slide button 8 is then moved to the upper end of the slot 7 in the indicator plate 3 and likewise the programmer pin 14 is moved out of the V-notch 60 to the top of the notched slot 10 in the plate 11 as shown in FIG. 4. The movement of the programmer pin 14 out of the V-notch 60 to the position shown in FIG. 3 results in closing the switch 41 by presenting the cam surface 40 of the cam member 37 to the switch operator 42 as shown in FIG. 4 to close the circuit to the motor. The closing of the switch 41 activates the motor to drive the turntable 27 (FIG. 1) through the belt drive 29 from the two diameter pulley 26 on the motor shaft to the cylindrical drum 28 on the underside of the turntable. This results in rotation of the turntable, the hub 32 of which comprises a pinion 35 integral with the hub of the turntable with interrupted gear connection between the continuously rotating pinion 35 on the continuously rotating turntable hub and the intermittently rotated cam gear 33. The pinion 35 has a full complement of teeth but the cooperating teeth on the cam gear 33 are interrupted at 37 (FIGS. 1 and 11). A lug 61 integral with the depending bearing sleeve or hub of the turntable 1 is disposed below the plane of the pinion 30 as viewed in FIG. 11 and the cam gear 33 carries on its underside and in register with the lub 61 a lever 62 pivoted at 63 and having its outer end 64 disposed adjacent to but normally turned out of the path of the lug 61 on the driving pinion 30. The lug 61 on the hollow turntable shaft (below pinion 30) and the end 64 of the lever 62 are disposed in a common plane below the gear 33 and pinion 30 above referred to. The lever 62 has a rearwardly extending arm 65 beyond the pivot 63 with an offset end 66 playing with limited motion in a motion limiting slot 67 in the body of the gear 33. The lever arm 62 also is rigidly connected on the same shaft 63 with throw lever 68. The lever 68 is moved to set the end 64 of lever 62 into the path of pinion lug 61 by the trip lever 50 attached to tone arm shaft 19 (FIG. 11). The tone arm shaft 19 is swung by lever 80, 82 and cam follower 83 moved by the main cam gear 33. This swings lever 80 bearing the shoe 94 which rolls against the lower half of the collar or friction sleeve 48 to move the collar and connected tone arm shaft 19 in a clockwise direction in FIG. 13.

As indicated in FIG. 11 the turntable pinion 30 rotating with the turntable has its full complement of gear teeth in register with the teeth on the cam gear 33. As the cam gear 33 rotates in the direction of the arrow, i.e., counterclockwise in FIG. 11, the blanked out gap 37 in the teeth of the cam gear will approach the teeth of the pinion 30 and engagement of the two gears will be lost, and the mutilated cam gear 33 will not mesh, but the continued rotation of the shaft 31 of the pinion 30 will bring the moving lug 61 into engagement with the end of the trip lever 62 before any disengagement occurs and will push the cam gear angularly far enough that the pinion teeth will meet and mesh with the oncoming gear teeth. Obviously, if the clutch lever 62 were not in position to receive the push of the lug 61 which is connected to the pinion 30, the pinion 30 and gear 33 would remain disengaged when the blank 37 arrives in the position shown in FIG. 11. The lug 61 and clutch lever 62 lie in a plane below the said gears 30 and 33 where they do not interfere with the meshing and unmeshing of the pinion and gear teeth.

When the program is completed the motor switch 41 will have its actuator 42 arrive at the drop off or low point in the cam 43 as shown in FIG. 10.

Operation of Meshing Gears

Having loaded the spindle 35 of FIGS. 1 and 11 with a capacity charge of six records to be played in a program—assuming in this case that they are 33 RPM 12 inch records as indicated on chart 3 in FIG. 1, and assuming that the knob 8 is in register with the OFF position shown in FIG. 1—the operator slides the knob 8 to the topmost position 6 as indicated in FIG. 1. This thrusts the programmer rod 15 from the lower dotted line position shown in FIG. 1 to the upper dotted line position shown in FIG. 2 where the knob 8 registers with the numeral 6 on the chart. This moves the programmer rod pin 14 into the position shown in FIG. 3 where the programmer pin 14 lodges in the topmost round notch 10a formed on the edge of the slot 10 in the base plate. This upward diagonal motion of the programmer pin 14 is accompanied by stretching of the tension spring 39 which extends between said programmer pin 14 and the offset crank portion 70 of the cycle control rod 71 which is journaled at its ends in brackets 72 and 74 mounted on the bottom of the base plate (FIGS. 2 and 11). At its lower end the cycle control rod 71 terminates in a right angle bend 73 operating as a crank arm on the body of the rod 71, said crank arm 73 being connected to the CYCLE button 9 accessible from the face of the indicating chart 3. The rod 71 beyond the offset crank 70 is journaled in a bearing bracket 74 mounted to the base plate 1. The offset crank 70 projects above the face of the base plate where it connects with the spring 40 and the crank 70 is connected to one end of the tension spring 39, the opposite end of said spring being attached to programmer pin 14 which has a flanged plastic collar 14a, or deadening contact noise, carried on the free bent end of the programmer pin 14 (FIGS. 7, 8). The cycle control rod 71 beyond the bearing 74 is bent at right angles to form a swingable arm 75. The arm 75 extends at right angles to the length of the rod 71 bears on its free end a flexible coil spring finger 76. When the CYCLE button 9 is depressed, the rod 71 is rotated through an angle great engough to tension the spring 39 by crank 70 and to apply a light yieldable pressure to the clutch lever 65 by the spring finger 76, which lies beyond the swingable arm 75 of the rod 71 (FIG. 12).

The pressure applied to the CYCLE button 9 thus operates to bring the front end 64 of the lever 62 which is carried by the cam gear 33 into the path of the rotating lug 61 on the pinion hub and thereby puts the gears 33 and 35 into mesh to complete a rotation of the cam gear 33 and perform a record dropping and playing operation. When the tone arm 18 swings into the fast groove of the record, trip lever 50 will throw the clutch lever 62 into the path of lug 61 and cause meshing of the gears 30 and 33, and performance of a cycle ensues.

Control of the Motor Circuit

The driving motor 25 is under the control of the switch 41 which has an actuator 42 which rides on the edge 40 of the programmer plate 11. The programmer plate is drawn clockwise (FIGS. 5, 11) by the spring 38 and its angular motion in that direction is limited by the programmer pin 14 which does not descend below the ON position when completing the playing of a stack of records as in FIG. 2. In that position the switch actuator 42 remains depressed. When the knob 8 is moved from ON position to OFF position the end 16 of the programmer rod 15 enters the V-notch 60 and the programmer plate 11 swings under the pull of spring 38 clockwise to bring the V-notch 60 over the programmer pin 14. This angular movement of the programmer plate is sufficient to bring the notch 43 in register with the switch actuator 42 thereby allowing the switch 41 to open the motor circuit (FIG. 10).

Structural Details to Avoid Noise in the Programmer

Since the fundamental character of the programmer is a mechanical escapement involving moving parts to process successive records through the playing stage, an objective of the present programmer is the provision of mechanism performing the essential functions with a minimum of noise and particularly obtaining elimination of metallic ticking or clicking noises which detract from the illusion of hearing original music. The present novel combination of elements is particularly effective in reducing distracting noises. To that end the mechanical parts which form the chief operating agents of the programmer where noise tends to be produced are at important points constructed of plastics and are designed to avoid impact of metal-to-metal at points where unwelcome noises would tend to be produced.

Noise reduction is effected in the following situations. The driving belt from the motor to the drum 28 on the turntable 27 is a rubber-like plastic material which insulates motor hum from the playing mechanism.

While the pinion 30 for driving the cam gear is formed as part of the turntable, the combined gear and cam 33 is constructed of "Delrin" plastic. The cooperating programmer plate 11 is also made of "Delrin" so that the impact of rubbing of the teeth 13 upon the programmer pin 14 which recurs at each record change will be silently performed. Also, as illustrated in FIGS. 5–10, the programmer pin 14 which is part of the metallic programmer rod 15 is sheathed with a flanged collar 78 of plastic so that its engagement by the metal teeth 13 of the programmer, and consequent impact upon the notches 10a in the base plate may be deadened to substantial silence. By thus interposing plastic sound insulation where metallic impacts would otherwise occur, the reduction in noise of operation of the present device is materially promoted.

Turning to FIG. 1 and briefly recapitulating the operation so far involved, a top view of the embodiment exhibits the central spindle 35 with a suitable record retaining shoulder and pushoff lever of known construction. The turntable 27 occupies the full width of the housing and leaves room at one end—the right in FIG. 1—for the tone arm and pickup 18 and 21 and a narrow control panel along the same end of the base plate with suitable control members thereon including the chart and control button 6a relating to selection of size and playing speed of the records in a particular loading of the stack to be played. The chart contains a major portion devoted to the programmer including indications of the number of playings contemplated and indications of the condition of the drive as OFF or ON for automatic operation or postured for manual operation together with a starting button 9 to put the programmer into play.

FIGS. 2, 11 and 13 shown the control button as adjusted for 12 inch 33 RPM records. This is accomplished by the provision of an elastic belt drive and shifting of the elastic belt to the smaller motor pulley and the set down lever activated accordingly. This drive arrangement per se forms no part of the present claimed invention. The selection of record size and speed is controlling of the set down position of the tone arm and pickup. This is apparent in FIG. 13 from the position of the rest lever arm 54 which stops the tone arm in register with the first groove of the selected size of record. This is accomplished by limiting the swing or extent of arc of motion of the trip lever 50 illustrated in FIGS. 2, 5 and 6. A lever arm 54 pivoted on the base plate on axis 12 and actuated by the cam gear at the timing of swing out of the tone arm stops the tone arm for set down selectively for 7 inch and 12 inch records according to the positioning of the control knob 6a.

The setting down of the pickup needle in substantially the first playing groove is accomplished by an appropriate axially offset portion of the rotatable cam 33 which cam has a drop in the track allowing the lowering of the tone arm and pickup to play the record uppermost on the turntable. This position is illustrated in FIG. 13.

When the record groove at the end of playing of a record swings the tone arm 18 inwardly to its innermost position, the trip lever 50 assumes the position shown in broken lines in FIG. 11 and sets the clutch lever 62 to mesh the gears 30 and 33 and produce rotation of the cam.

The resumption of rotation of the cam swings lever 80, 82 to apply the shoe 94 to the collar 48 of the tone arm shaft and the plate 83a of the tone arm lift pin 88 and thus returns the tone arm and pickup in raised position back to the initial position shown in FIG. 13.

Assuming that the spindle has been charged with six 33 RPM records, operation is initiated as follows: Assuming that the control button 8 remained in the OFF position as indicated in FIG. 1, the turntable is not moving since the switch actuator 42 (FIG. 1) has dropped into the depressed notch 43 on the edge of the cam 11 and the motor circuit is interrupted. The first step, therefore, after reloading the spindle with, for example, six records of the desired 12 inches 33 RPM speed as shown by the position of the control button 6a in FIG. 1, the control button 8 is moved from the OFF position in FIG. 1 to the ON position. Moving the button 8 to ON position causes the rod 15 to shove the pin 14a out of the V-groove 60 shown in FIGS. 2 and 5. This causes the programmer plate 11 to move a short distance counterclockwise (FIG. 2) whereby the cam edge 40 depresses the switch actuator 42 to close the switch 41 and start the motor and turntable in operation. The cam gear 33 has its missing teeth at 37 registering with the pinion 32 on the hub of the turntable. To set the cam gear 33 into operation it is necessary to trip the arm 62 (FIG. 11) into the path of the moving lug 61 which is connected to the driving pinion but below the plane thereof.

The operator will therefore depress the CYCLE button 9 at the foot of the index plate 3 to set the player into action. The CYCLE button 9 is connected to the rockable rod 71 which at its outer transverse end 75 (FIG. 12) has a coil spring 76 swingable against the arm 65 of the detent lever 62 to swing the front end 64 into the path of movement of the lug 61 integral with the turntable hub 30 and pinion 32.

This puts the cam gear 33 and the driving pinion 30 into mesh and the cam gear 33 has the necessary cam throws and dwells and drop-offs to swing and lower the tone arm and pickup into the first record groove and later to lift the tone arm and pickup out of the groove and move the tone arm to the rest position of FIG. 1 at the end of playing in a manner well known in the art.

Each rotation of the cam gear 33 corresponds to a playing cycle including swinging of the trip lever 50 to its outermost position, dropping the record, lowering the needle into the groove and after completing playing the record, lifting the tone arm and swinging it aside for dropping a record causing meshing of the gears, rotation of the cam gear 33, lifting of the tone arm, swinging it into register with the first groove on the record as determined by the shoulder 54a to 54b of the set down lever 54 for the corresponding diameter of record followed by lowering, playing and lifting. and retraction of the needle activated through the profile of the groove 84.

Operation of the programmer

Assuming the parts of the programmer to be in the position illustrated in FIG. 1, the electric circuit for the motor 25 is open at the switch 41 since the switch actuator 42 has dropped into the notch 43 in the periphery of the programmer plate 11. The indicating and control button 8 on the lower end of the programmer rod 15 is at the OFF position.

The programmer pin 14 carried at the upper end of the rod 15 is disposed in the V-notch 60 at the lower end of the window or slot in the programmer plate 11, as illustrated in FIGS. 6 and 10. In that condition of the parts, the motor switch 41 is open by virtue of the actuator 42 thereof having dropped into the notch 43 and this has allowed the motor switch 41 automatically to open the circuit and stop the motor.

Loading for Playing a Program and Starting Player

Six records, all of the same size and design speed (for example 12 inch records 33RPM), are threaded onto the spindle 35; the clasp 23 on the tone arm 18 is released; the speed and size selector button 6a is moved to the 12 inch 33 RPM position; and the program button 8 is moved in the slot 7 to the position indicated by the numeral 6 at the top of the column of program numbers. This upward sliding movement of the button 8 forces the pin 14 out of the V-notch 60 in its movement toward the uppermost notch 10a in the slot 10 and in so doing the pin 14 moves from the position of the parts shown in FIG. 10 where the pin 14 is still resident in the V-notch 60, into the position indicated in dotted lines in FIG. 2. The motor will then begin to rotate but will not drive the cam gear 33 because the drive connection of pinion 30 and cam gear 33 was severed upon completion of the last previous cycle of playing a record. The connection between the pinion 30 on the hub of the turntable 27 and the cam gear 33 is interrupted by the fact that the gap 33a in the teeth of the cam gear 33 is opposite the pinion 32 and the clutch lever 62. While it is horizontally in register with the pinion 32 it has not been brought radially outwardly into the path of the lug 61 which lies axially below and is integral with the hub of the pinion 32.

It is therefore necessary in order for the machine to be brought back into action to swing the end 64 of the lever 62 radially outwardly of the cam gear 33 in order to be engaged by the rotating lug 61 which is formed on the hub of the gear 30 and in register horizontally with the end of the lever 62.

This engagement is brought about by the operator depressing the CYCLE button 9 shown in FIG. 1. The CYCLE button has a crank connection with the rod 71 (FIGS. 11, 12 and 13). The end of the rod 71, remote from the CYCLE button 9, has a right angle extension 75 carrying on its outer end as shown in FIG. 12, a flexible coil spring finger 76 which aligns transversely with the arm 65 of the clutch lever 64. When the CYCLE button 9 is depressed the rod 71 is cranked to bring tthe contact spring 76 into engagement with the arm 65 of the coupling lever 62 which is thrown into the path of the rotating lug 61 to start the operation of rotating the cam gear 33. This rotation continues through more than one revolution only if the end of the lever arm 62 is again swung into engaging position with the lug 61 before completion of a revolution. This latter action occurs in the course of completing the playing of a record when the trip lever 55 contacts and resets the clutch lever 62 (FIG. 11). However, when the last record is played the knob 8 will arrive at the OFF position, as explained below. When the programmer pin 14 arrives at the incline 56e of the rest lever 56 the pin is pushed into registration with notch 60 (FIG. 6) and the switch 41 is opened.

The cam gear 33 which starts from rest in the position shown in FIG. 13 performs a series of mutually related operations in conjunction with the elements illustrated in the drawings and herein described as to their structure and functions.

The Cam Gear 33

The cam gear 33 is a combined mutilated gear and control cam having a central hub journaled on the pin 34 which is supported on the base plate 1. The overall function of the cam gear 33, after the current has been turned on at the switch 41, the stack of records to be played having been threaded on the spindle, the indicator button 8 having been moved to the sixth position for a full load of records, and the button 6a having been moved to the position shown in FIG. 1 for the 33 RPM 12 inch records to be played, the starting button 9 (CYCLE) is depressed. This causes the rod 71 to swing the finger 75 against the short arm 65 of lever 62 throwing the end of the lever 62 at 64 into the path of the lug 61 and thereby putting the two gears into mesh.

The normal rest position of the cam gear 33 is shown in FIGS. 11 and 13. The meshing of the gears 33 and 32 produces rotation of the cam gear 33 counterclockwise in FIGS. 1–12.

FIGS. 1–12 are all taken in plan view on a horizontal plane either from above the level of the base plate as in FIG. 1 or looking down on a horizontal section immediately below the base plate 1. FIGS. 2–12 all show the parts as viewed from above in horizontal section immediately below the base plate, whereas FIG. 13 is a bottom plan view—i.e., looking at the bottom of the base plate and the elements visible from that view point. It should be noted that this brings the direction of rotation of the rotatable parts in a counterclockwise direction in FIG. 13 for the same parts and the same operations clockwise in FIGS. 1 to 12.

There are two chief types of motion aside from the rotation of the turntable which are required for playing a record. The first motion is performed by the cam gear 33. It is a vertical upward motion of the tone arm produced by raising the pin 88; the second is a rotary motion of the tone arm shaft 19 to swing it angularly for placing the needle into register with the outermost playing groove at the outer margin of the record and the return of the tone arm and needle from the innermost groove to the rest position radially beyond the outermost groove of the particular size of the record being, or to be, played.

The lift pin or plunger 88 (FIGS. 1 and 13 in dotted lines) at its lower end rests upon the left hand end of the lever arm 83a. Said plunger 88 is guided in a bore formed in the tone arm mounting block 89 (FIGS. 1 and 2) which plunger at its upper end is engageable with the lower surface of the horizontal gimbal ring attached to the tone arm and sufficiently off center with respect to the horizontal mounting axis of the tone arm to permit upward pressure on said plunger 88 to produce upward swinging movement of the tone arm 18 about its horizontal axis to lift the pickup clear of the stack of records that is held on the table.

The vertical rocking motion of the arm 83a of the compound cam follower lever 80 operating to move the plunger 88 to raise and lower the tone arm is produced by movement of lever 82 because of its follower 83 riding up and down in the cam groove 84. The limited rocking movement of the lever 80 vertically by the cam groove and follower of the lever on the pin 81 (which is an extension of pin 12) is permitted by a loose coupling held in alignment by a compression spring on the mounting pin 81. The deepest part of the cam groove 84 is disposed under the cam follower 83 as illustrated in FIG. 13. This is deep enough to allow vertical freedom for the pickup to adapt to the maximum height of the stack.

The lever 80 is mounted on bearing pin 81 providing a limited degree of universal movement. That is to say the cam follower pin 83, when it rides deeper in the groove 84, is accompanied by lowering of the end or arm 82 of the lever 80 and raising of the arm 83a with consequent lowering of the vertical tone arm lift plunger 88.

The cam groove 84 has its lowest point, i.e., its greatest depth with respect of the fIollower 83, between the points x and y on FIG. 13. In this region, the tone arm control lever 83a is raised and swung away from and returned to the turntable. At the point y and proceeding in a direction backward to the direction of rotation, counterclockwise in FIG. 13, the groove 84a dips down to a maximum at the point where the pin 83 is illustrated in FIG. 13. From the point indicated by the follower 83 to the point marked x, the groove rises in the axial direction.

The cam groove 84 between the regions of y and x is a substantially concentric with the supporting shaft or pin 34. Beginning at the region of the point x, there is a sharp rise in the cam groove and at the same time an increase in the radium thereof. These surfaces produce rise and radial outward motion of the follower pin 83 and the end of the lever arm 82. This increase in radius continues to approximately the point z whereupon the groove maintains substantially the same depth and same radius to about the point w and then the radius of the track contracts gradually to about the point 80a where the minimum radius begins and continues on to the point 84a.

The significance of these changes in radius of the groove and the axial depth of the same lies in the effect which they have upon the follower pin 83 mounted on the tone arm control lever 80 and the swinging of the tone arm shaft 19. The rise and fall of the pin 83 on the arm 82 of the lever 80 rocks the lever 80 on the universal motion mounting 81 to produce an up and down motion of the tone arm by means of plunger 88. This causes swinging of the tone arm 18 in a vertical plane to raise and lower the pickup needle. The compound tone arm control lever 80 is swung horizontally about the pivot pin 81 by the cam groove as said groove increases or decreases in radius during its rotation.

Cam Control of Angular Return Movement of the Tone Arm

The lever 80 has an extension 90 slidably mounted on pins 91, 91 fixed on the said lever arm 83a and slots 92, 92 in the extension 90. The lever extension 90 is urged for limited motion in an outward radial direction relative to pivot pin 81 as guided by the pins 91 and slots 92 by means of a compression spring 93 which spring 93 is disposed between parallel flanges on the lever extension 90 and the tone arm control lever 80.

The extension 90 on the rocker arm 83a carries a shoe 94 with a cylindrical friction surface for engaging, rolling upon, and driving the cylindrical surface of the hub 49 mounted on the tone arm mounting shaft 19. The hub is constructed of a synthetic resin such as Delrin which provides a good friction surface to produce rolling motion.

By the foregoing construction the cam groove 84 operating on the follower pin 83 on the tone arm control system may, in the position shown in FIG. 13, cause the tone arm control lever 80 to push the pin 88 upwardly as viewed in FIGS. 1 and 2 (downwardly as viewed in FIG. 13). thereby the tone arm is raised according to the depth of the cam groove 84 as the cam gear 33 is rotated.

Swinging of the tone arm 18 horizontally on its vertical shaft 19 is accomplished by movement of the lever 80 drven by the cam groove 84, said lever moving in a plane parallel to the plane of the paper of FIG. 13. Swinging the arm 82 outwardly radially of the axis of the cam 33, as viewed in FIG. 13, will swing the shoe 94 into engagement with the cylindrical surface of hub 49 mounted on the lower end of the tone arm supporting shaft 19.

Counterclockwise movement of the shoe 94 in FIG. 13 about the pivot 81 and its engagement of the hub 49 will swing the tone arm shaft 19 and its connected tone arm in a clockwise direction. By these operations the tone arm is first lifted to take the pickup out of the playing groove and then is swung radially outwardly with respect to the turntable to clear the turntable and the record that has just been played. Then the next record in the programmer is dropped and the tone arm pickup is swung over and lowered into the outermost groove on the record next to be played and playing proceeds.

Record Dropping Control Cam 95

The cam gear 33 carries an integral cam 95 of involute shape on its radial surface (FIG. 13). this cam 95 is mounted as part of cam gear 33 on the shaft 34 which carries the cam gear 33 and also the cam 84 and its groove. The cam 95 engages a follower lever 96 through its shoe 98 which rides upon the surface of the cam 95 under the pressure of a long coil tension spring 97 attached at its upper end to a lug on the base plate and at its lower end to the follower lever 96. The spring is initial tension and the length of the spring is related to the throw of the cam to make the accumulating loading of the spring increase at a low rate but to provide substantial kick against the record dropping spindle lever when the follower shoe 98 drops off the high point 99 of the cam 95.

The drop off of the follower from the high point of the cam 95 is an inclined surface which is engaged by the follower 98 of lever 96 to reduce the noise and vibration of engagement of the follower with the hub of the cam.

The timing of the two cams is such that the tone arm 81 has been raised from the last played record and swung aside to allow of the descent of the next record to be played, which dropping of the next record is brought about by the kick of the spring actuated lever 96 against the lower end of the spindle lever at 35 in FIG. 13. The cam follower lever 96 swings on the pivot 100 carried by the bracket plate 101 which is mounted at both ends on the bottom of the base plate 1.

By this construction of the gradual loading of the spring for the tripping lever 96 for tripping the spindle lever, the load on the motor for performing the record dropping operation is distributed over the major portion of the playing cycle and is not sharply increased at any point.

Selection of Record Speed and Set Down Radius for the Tone Arm

The operations heretofore described which are regulated by the cam gear 33 apply equally to the stacking and playing of either the larger 12 inch 33 RPM records or the smaller 7 inch 45 RPM records. However, the driving speed of the record relative to the needle and the radius of set down must be adjusted and set to take into account the different requirements of the two different types of records. The countdown mechanism of the programmer operates in the same manner for both sizes of records, the exception being that the angle of swing out of the tone arm and its pickup and the radius of setdown are required to be adjusted to the difference in the records the changing from one size and speed to the other size and speed. The adjustment is effected by the shifting of the button 6a.

Adjustment for Change in Size of Record in the Stack

Since the drive from the motor to the cam gear is through the turntable to the cam gear and from the cam gear to the programmer, change in speed is accomplished in this construction by a simple belt shifting of elastic belt from one pulley diameter to another (not shown) in the drive between the motor shaft pulley and the turntable drum. The speed of the cam and the operations which it controls are tied together. Consequently the operations of dropping a record from the spindle onto the turntable, swinging the tone arm inwardly, and lowering it into the first groove require only that the set down point be adjusted to the diameter of the outer groove of the record. The playing proceeds at the speed determined by the setting of the speed adjusting button 33. The switch from one size record playing to the other size is effected by the selecting button 6a which is equipped with an overcenter snap spring to reduce possible conflicting influences upon the drive members.

A Record Playing Cycle

In the course of playing a record, after the tone arm has swung the trip lever 50 into the position shown in broken lines in FIG. 11 where it trips the gear engaging trip lever 68, the cam 33 is put into gear and moves the tone arm control lever 80–82 to tilt the same about the pivot 81 by raising the pin 83 and its connected arm 82 upwardly with respect to the plane of the paper in the drawing (FIG. 13) and moving the opposite end 83a downward with respect to the plane of the paper (FIG. 13) and thereby raising the tone arm and pickup by forcing the lift pin 88 upwardly against the ring 21a causing the tone arm to raise the pickup to clear the record on the turntable.

Then the track 87 in the cam groove passing under the pin 83 off the lever 82 swings lever 80 counterclockwise in FIG. 13 to cause shoe 94 to roll the hub 48 clockwise in FIG. 13 thereby removing the tone arm from over the turntable and shortly thereafter the spring tensioning cam 95 passes its high point 99 over the cam follower 98 on the spring tensioned arm 96 to allow said arm 96 to drop down the slope 102 of the cam 95 and actuate the pushoff lever of the spindle to lower a record from the stack held on the shoulder of the spindle to the turntable.

The continued rotation of the cam gear 33 brings lowering of the arm 82 and pin 83 to the low spot 84a at which point the tone arm and pickup have swung down to the record on the turntable to play the record last dropped. The parts will then stand in the posture shown in FIG. 13 waiting for the completion of playing of the record and arrival of the pickup at the fast groove at the center of the record which brings the trip lever 50 into the posture shown in broken lines in FIG. 11. Thereupon the trip lever tilts the clutch lever 68–62 into engagement with the teeth of the moving pinion and a revolution of the cam gear 33 is initiated. The control knob 8 riding in the slot 16 has control of the switch 41 as is indicated in the label MAN, meaning manual control of the player as, for instance, if the operator should wish to play a single record or a part of the same he is able to do so. By moving the control button 8 (FIG. 1) from "off" position to MAN (Manual), the operator may switch on the motor and put the turntable into motion and energize the pickup for manual control of operation of the player. The mechanical connections for continuous drive are shown partly in broken lines in FIG. 1 and in full lines in FIGS. 3–13. By moving the button 8, shown in FIG. 1, from the "off" position to the lower position, marked MAN (manual), the programmer rod 15 which, when the button was in the position shown in FIG. 1 marked "off", held the programmer rod 15 in the position illustrated in FIGS. 6 and 10 wherein the upper horizontal end of the rod in the form of the horizontally extending pin 14 is lodged in the notch 60 of the programmer plate 11. It is yieldably held in the notch 60 by the arm 56d of the spring held rest lever 56.

The horizontal pin 14, when it is registered with notch 60 by the act of moving the slidable button 8 down to the position in the slot 7 marked MAN, had compelled the programmer plate 11 to swing angularly from the "off" position, illustrated in FIGS. 6 and 10 to the "on" position of the switch shown in FIG. 5.

The above explained arrangement permits the operator to put the player under manual control by moving the slide buttom 8 from the position marked "off" to the position marked "on" and to restore automatic control by restoring the control button to the position shown in FIG. 1.

I claim:
1. The combination with an automatic phonograph record player having:
   an electric driving motor (25),
   a base plate (1) having a programmer indexing slot (7) and a slot (10), the slot (10) having a series of notches (10a) along one edge thereof corresponding to the maximum number of records to be played in a programmer,
   a rotatable turntable (27) mounted above the base plate and driven by said motor,
   record stacking and feed means (95–96) for holding a series of records to be played and for feeding them one at a time onto the turntable to be played in succession,
   a tone arm (18) having a pickup (22) adapted to be applied to and removed from records in succession for playing the same,
   automatic control cam means (33) for controlling the playing of a plurality of records in sequence, in cooperation with numerically adjustable counting,
   means (11, 14, 15, 16, 7, 8) for counting the number of record playings,
   adjustable stopping means controlled by said counting means for stopping the motor when the predetermined number of playings of records has been completed,
   said counting means comprising a sector-shaped programmer plate (11) and means (12) pivotally mounting the plate (11), the plate (11) having a sector-shaped window, one side edge of which comprises a succession of teeth 13 of a number great enough to correspond to the maximum number of records to be played in a program, and on the other side an edge (60a) with a notch (60) at the lower end,
   said stopping means comprising a motor switch and a programmer rod (15) having a transverse terminal programmer rod pin (14) at the one end and a pin (16) at the other end, and a spring (39) biasing pin (14) against the notches (10a) and downwardly toward notch (60), the pin (14) positionable successively in said notches (10a), whereby the pin (14) is progressively shifting the said terminal portion (14) of said rod from its initial notch position to a notch (10a) in alignment with notch (60),
   means for reciprocating the plate (11), which means includes a cycle cam gear (33), cam pin (36) on the cam gear, and a spring (38) to bias the plate (11) against the cam pin (36) and spring 38, and to bias the side edge (60) against pin (14),
   means (8) to maintain pin (16) in indexing slot (7),
   switch means (41-42) for stopping the operation of said player means by opening the motor circuit at said switch, and
   means (40 and 43) on the plate (11) to actuate the switch means (41-42) upon further pivoting of plate (11) by spring (38) when pin (14) is aligned with notch (60).

2. In a record player having:
   a base plate (1),
   a turntable (27) rotatably mounted on the base plate and having a driving drum,
   a record holding and feeding means comprising a spindle (35) having a pushoff lever for dropping records successively from the spindle onto said turntable,
   a cooperating tone arm (18) with pickup (22) for playing in succession the records dropped on the turntable,
   a driving motor with driving pulley and belt for rotating the turntable,
   cam means intermittentely driven by said turntable upon completion of the playing of each record for controlling the operation of said record feeding means and return of said tone arm away from the turntable, the combination with
   counting means for counting the number of consecutive playings of records to be effected, said base plate (1) having a slot (10) with notches (10a) along an edge thereof in number as great as the maximum number of records to be played in sequence in a program,
   a programmer plate (11) having an edge (37 and 40) and a notch (43) and pivoted on pin (12) biased by a spring (38) and overlying the slot (10) in the base plate and having a window in the plate with on one edge a series of cam teeth (13) registering with said notches (10a) in the base plate, and having another opposite edge (60a) with a notch (60) at the lower end thereof,
   a program rod (15) having its ends bent parallel to provide parallel pins (14 and 16), said pin (14) being guided along the edge (60a) of the window in the plate (11),
   a slidable program indicator button (8) on one end (16) of said rod (15) guided in the indicator slot (7) in said base plate and the other end of said rod (15) having said laterally extending program pin (14) guided in said notched slot (10) in said base plate,
   a spring (39) tending to hold said pin (14) laterally in any one of said notches (10a),
   said programmer plate (11) being pivoted at one end to swing said teeth (13) over the notches (10a) and thereby dislodge the program rod pin (14) out of the notch (10a) in which it is then held by said spring (39) and to be advanced to the next adjacent notch towards which said spring draws it, said programmer plate (11) having an edge (40) with a switch-off notch (43), a spring (38) biasing said programmer plate edge (60a) against said pin (14), said notch (60), when aligned with the pin (14), allowing further pivoting of the plate (11), a motor cut-out switch (41) with switch arm (42) which is automatically operated when pin (14) is in alignment in notch (60) for opening the motor switch (41), and a cam gear (33) with an eccentric pin (36), the cam gear driven by said motor through a complete cycle for each individual playing cycle of the record player for moving said programmer plate (11) by pin (36) against edge (37 and 40) laterally in said pin and notch disengaging operations.

3. In a programmer for a record player having:

a rectangular base plate and turntable rotatably mounted on said base plate, the combination of a record holder and feeder spindle and a cycling cam (33) for controlling the cooperation of the turntable with an eccentric pin (36) on the cam, tone arm and record feeder spindle, said base plate having a slot (10) inclined to a side edge of the base plate (1), one side edge of said slot having a series of notches (109) equal in number to the maximum number of records to be included in a program, a second slot (7) in the base plate adjacent and parallel to the side edge of said base plate, a program indicator knob (8) guided in said second slot, said first slot (10) being slightly inclined to said second indexing slot (7) and having, in cooperation with said knob, indications of the number of records which can be included in a projected program, a program rod (15) bearing at one end a pin (14) projecting laterally into said first-named slot (10) and connected at its other end to said indicating knob, a spring (39) connected between the base plate (1) and said pin (14) tending to retain releasably said pin (14) in any one of the notches (10a) in said slot (10), said pin (14), upon being disengaged from one notch, being drawn by the spring into engagement with the next adjacent notch, and the knob at the other end of the program rod to be shifted in its indicating slot to indicate the number of playings then remaining to be performed in sequence in a program, a generally triangular program plate (11) pivotally mounted on pin (12) at one corner of said base plate and said plate (11) being engageable on one side edge by the pin (36) of the cycling cam (33) upon completion of the playing of a record, and said plate (11) having cam teeth (13) matching the notches (10a) of the edges of the slot (10) in the base plate and being movable in one direction to push the program rod pin (14) out of one notch whereupon said spring-biased pin is shifted into the next adjacent notch whereby the program knob is moved to the next lower indication.

4. In a programmer record player the combination of:

a base plate, a turntable rotatably mounted thereon, a motor for driving said turntable, a record holding and feeding means for said turntable, a tone arm and pickup for playing records in succession on the turntable, a cycling control cam operating in conjunction with said turntable, said base plate having a slot (10) with a series of notches (10a) formed in one edge thereof, a programmer plate (11) pivoted at one end about pin (12) on the base plate and overlying the aforesaid slot (10), said programmer plate having a sector-shaped window, one edge of said window bearing a series of teeth (13) serving as cams for cooperating with the notches (10a) in the edge of the slot (10) to dislodge the contents of any one of said notches and an edge (60a) with a notch (60) opposite the teeth, a second slot (7) in the baseplate disposed adjacent said first slot (10) and lying at a small angle relative to said slot (10), a program indicator button (8) movable in said second slot (7), a program rod (15) connected at one end with said program slide (8), the opposite end of said rod bearing a pin (14) transverse to the longitudinal axis of the program rod and being guided in said slot (10) in the baseplate, a spring (38) connected between the programmer plate at a point remote from its pivoted end and the base plate and biasing the edge (60a) against the pin (14), a tension spring (39) connected between the program rod pin (14) and the base plate and having a component tending to hold said pin (14) in any one of said notches (10a) in the base plate and a component tending to move said pin when dislodged from one notch into the next adjacent notch in a direction away from the end of the slot nearest the anchorage of the programmer plate to the base plate, a motor switch (41) having an operating member (42) adjacent an edge (40) of the programmer plate (11) having a notch (43) for opening the driving motor circuit when the programmer plate (11) is swung in the direction toward the edge (60a), said V-shaped notch (60) in the side opposite said cam teeth for receiving the program rod pin (14) and allowing pivotal movement of said programmer plate (11) to an extent to allow automatic opening of said motor switch (41), and means moving with the aforesaid control cam for swinging said programmer plate (11) through an oscillation for each operation of playing a record.

5. In a record player:

a horizontal base plate (1), a turntable (27) rotatably mounted on the base plate (1) and journaled at (31) on a vertical axis on said base plate, an electric motor (25) for rotating said turntable, a cam gear (33) driven by said motor, said gear having an eccentric pin (36), a vertical tone arm shaft (19) journaled on a vertical axis on said base plate, a tone arm (18) pivotally mounted at its inner end on a horizontal axis (21a, 21b) on said tone arm shaft (19), a horizontal trip level (50) yieldably hinged on a vertical axis to said tone arm shaft (19) below the base plate, said trip lever (50) having a trip flange member (50a) at its outer end, said base plate having an indicating guide slot (7) with indicating numerals alongside and having also a slot (10) with a row of notches (10a) in one edge of said latter slot, said slots being inclined toward each other at a small angle, a programmer rod (15) having transverse parallel pins (14, 16) at its respective ends, said pins extending into the respective slots (10 and 7) aforesaid, the pin (16) in the first-named slot (7) being an indicator pin and having a manually operable button (8) for moving the said pin (16) longitudinally in its slot (7) and simultaneously moving the second pin (14) in the aforesaid slot (10) with the notches (10a), a tension spring (39) acting on said pin (14) substantially longitudinally and transversely with respect to said row of notches (10a) to hold the said pin yieldingly against displacement out of the notch in which it is lodged, a programmer plate (11) having a pivot pin (12) on the base plate substantially in line with the said row of notches in said base plate, said programmer plate (11) being pivotally mounted on said pin (12) for swinging motion of the plate (11) in a plane parallel to and over said notches (10a) in the slot (10), a spring (38), which spring biases the plate in a direction contrary to the direction of the cam gear (33), and also biasing the edge (60a) against pin (14), said programmer plate (11) having a sector-shaped window, one side of which has a series of cam teeth (13) matching and overlying the notches (10a) in said first-named slot (10), and said cam gear (33) operable in conjunction with the turntable (27) for swinging said programmer plate (11) back and forth in its own plane to cause its teeth (13) to cooperate with the programmer pin (14) to push the programmer pin (14) out of a notch (10a) in which it is held and allow it to drop into the next notch (10a) in the direction of the pull of said spring (39), said button (8) being moved along the first-named guide alot (7) to indicate the number of records remaining to be played after each reciprocating swinging motion of the programmer plate.

6. The combination with claim 5 of:
a pinion (32) continuously driven by said motor (25),
a mutilated cam gear (33) adapted to be meshed with said pinion (32) to bring about cooperation of a record on the turntable (27) and the tone arm (19) and pickup (32),
means governed by said trip flange member (50a) upon completion of playing of a record for causing meshing of the pinion (32) and cam gear (33) to bring about a rotation of the cam gear, and
rotatable cam track means (80a) with cam follower pin (83) in said track (80a) governed by said cam gear (33) for applying said tone arm (19) and pickup (22) to a record on the turntable to play the same.

7. In combination with claim 6 wherein said programmer plate (11) has:
a V-notch (60) in the side edge of the window which is opposite the teeth (13) and adjacent the end of the slot remote from the pivot (12) of the plate for receipt of the programmer pin (14) upon completion of playing the last record in the stack, whereby additional motion of the programmer plate about its pivot pin (12) is permitted, and
a motor switch (41) spring-biased to open position controlling the circuit of the driving motor and having an actuator (42) moved upon said additional motion of the edge (40) of the programmer plate (11) permitted by said recess (60) to cause the motor switch (41) to be opened automatically when notch 43 is reached.

8. The combination with claim 7 of:
a rest lever (56) pivotally mounted on the base plate (1) having an inclined edge (56e) and a narrow extension (56d) at the end thereof, and
a spring (58) to spring-tension the lever (56) for causing angular pivotal movement of said level (56) about said programmer pivot pin (12) but normally blocked by the programmer pin (14), said rest lever (56) having a blocking arm (56c) for blocking the trip lever (50) and being released when the pin (14) moves between edge (60a) and edge (56e), and extension (56d) becomes engaged in notch (60) and allows the motor switch (41) to open and thereby stop the motor.

9. In a record player for automatically playing consecutively records of any number within a predetermined limit, the combination of:
an oblong base plate (1) upon which is mounted a rotatable turntable (27),
a driving motor (25),
a blet drive (29) from the motor to the turntable,
a pinion (32) driven by the turntable, said pinion having a driving lug axially of the shaft thereof,
a rotatable cam gear (33) with a gap journaled on the base plate and having an eccentric pin (36) and a clutch lever (62) cooperable with the driving lug (61) of the pinion for bridging the missing tooth and thereby completing the drive of the pinion to the cam gear for one full revolution of the cam gear,
manual means (8–15) for actuating said clutch lever for initiating automatic operation of the player,
automatic means comprising the aforesaid pinion lug (61) for continuing the drive of the cam gear (33) by the pinion (30),
said base plate having a guiding and indicating slot (7) along a side edge of the base plate, and a diagonal slot (10) inclined diagonally downwardly but spaced apart from the slot (7) and having a series of contiguous notches (10a) in the edge remote from slot (7), and a substantially straight edge opposite said notches (10a),
a sliding indicator button (8) in said slot for indicating the number of playings remaining to be played,
a programmer rod (15) having its ends (14,16) bent at right angles to the intermediate straight portion and lying in the same plane and in the same direction, said rod (15) having its upper lateral bent end (14) forming a driving pin disposed in and guided in said diagonal slot (10) in the base plate, and having its lower lateral end (16) connected to button (8),
spring means (39) tensioned to draw the pin diagonally successively into each of the notches (10a) and lengthwise of the slot, there being indicia on the base plate adjacent the indicating slot (7) for indicating the number of playings that will be performed before the program is automatically terminated, a generally sector-shaped programmer plate (11) pivoted at its apex (12) on the base plate adjacent to and overlying said notched slot (10) in the base plate, said plate having a triangular window with wedge-shaped cam teeth (13) disposed along and extending from that edge of the window which is farthest from the indicating slot (10), edge (60a) and a notch (60) in the lower end of the opposite edge of the window and having a lower edge (40) with a notch (43) at the one end thereof, said teeth (13) overlying the notches (10a) of the slot (10) in the base plate, said programmer plate comprising a cam follower (37) engageable by the eccentric pin (36) carried by the cam gear, and a return spring (38) for reciprocating said programmer plate (11) and for biasing edge (60a) against pin (14), each reciprocation of the programmer plate displacing the driving pin (14) of the programmer rod and said connected rod to move the indicator pin (16) to the indicating slot upon completion of a record, and a motor control switch (41) with arm (42) which is automatically operated when the pin (14) is in alignment with notch (60) for opening the motor switch (41).

* * * * *